C. W. DEARDORFF.
GREASE CUP.
APPLICATION FILED OCT. 13, 1917.
1,262,461.
Patented Apr. 9, 1918.
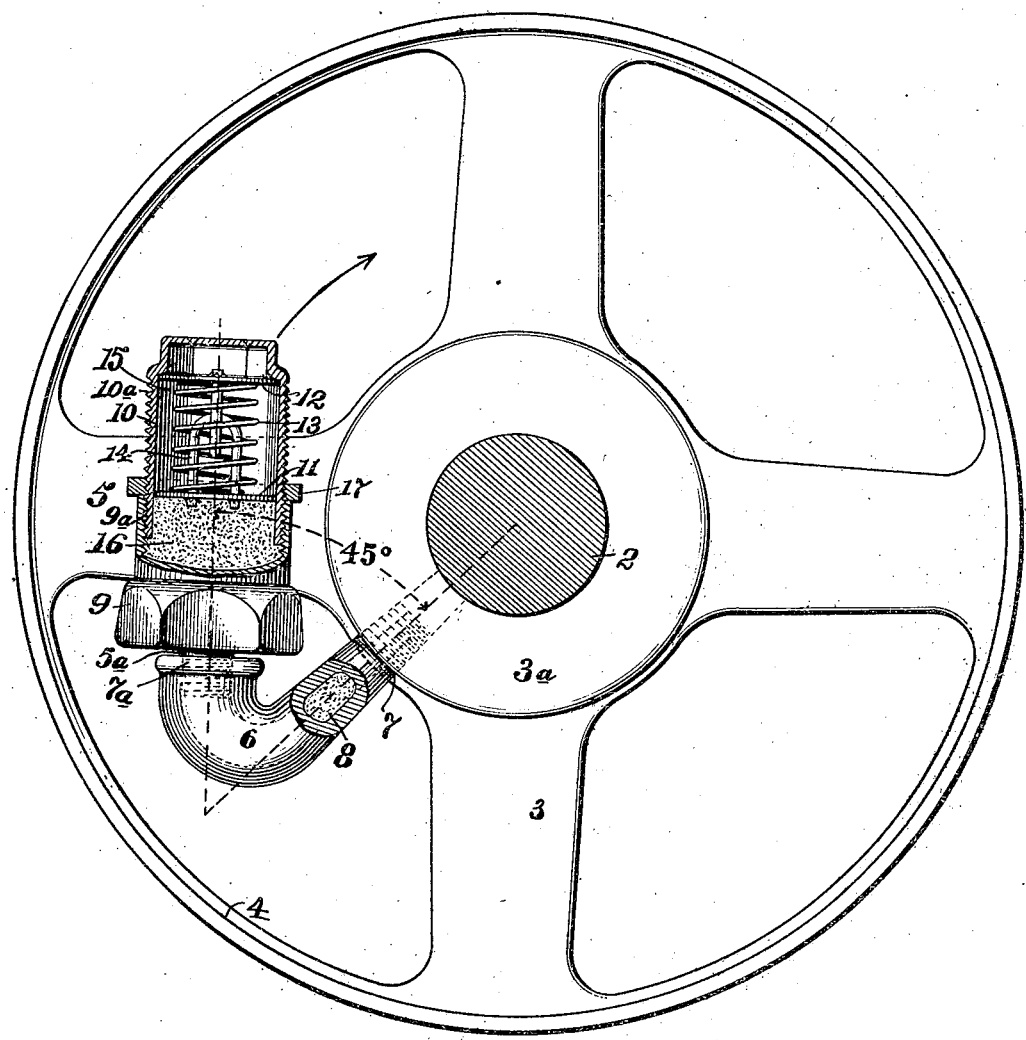
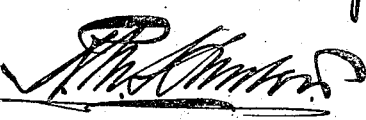

UNITED STATES PATENT OFFICE.

CURTIS W. DEARDORFF, OF PHILADELPHIA, PENNSYLVANIA, ASSIGNOR TO HUNTER PRESSED STEEL COMPANY, A CORPORATION OF PENNSYLVANIA.

GREASE-CUP.

1,262,461.  Specification of Letters Patent.  Patented Apr. 9, 1918.

Application filed October 13, 1917. Serial No. 196,369.

*To all whom it may concern:*

Be it known that I, CURTIS W. DEARDORFF, a citizen of the United States, and resident of Philadelphia, county of Philadelphia, and State of Pennsylvania, have invented an Improvement in Grease-Cups, of which the following is a specification.

The object of my invention is to provide a grease cup lubricator means for idler pulleys and other revolving devices which require lubrication while running in such manner as to overcome the detrimental influence of centrifugal force caused thereby and which cannot be conveniently lubricated through the supporting shaft.

My object is further, to employ an automatic grease cup, having means for feeding the grease in a positive manner to the bearing of an idler pulley or other rotating device, and combining therewith, an angular tubular coupling elbow whereby the cup will be positioned with its direction of discharge generally tangential to the hub and rearwardly to its direction of rotation, the grease so discharged being then guided through the coupling to the bearing or shaft upon which the pulley or other device is supported, the result of which arrangement is to conserve radial space, employ the inertia of the mobile body of grease to assist in its transference inward to the bearing and also to overcome the detrimental action of centrifugal force which normally acts to retard the grease flow toward the bearing.

My invention also consists of improvements hereinafter described whereby the above objects and results are attained, said improvements comprising certain organization and combination of parts which are fully described hereinafter and more particularly defined in the claims.

For the purpose of illustrating my invention, I have shown in the accompanying drawings the embodiment thereof which is at present preferred by me, since the same is in form to give satisfactory and reliable results, but it is to be understood that the several instrumentalities of which my invention consists, can be variously arranged and organized and that my invention is not limited to the precise arrangement and organization of the instrumentalities herein shown and described.

In the drawing, I have shown a side elevation of an idler pulley supported upon its shaft and having my improved lubricating means applied thereto and shown partly in section.

3 is an idler pulley and has its hub $3^a$ journaled upon the shaft 2. A grease cup 5 is secured in position between the hub and rim 4 of the pulley by means of a tubular coupling 6 having one end 7 screwed into the hub and having its other end $7^a$ provided for attachment of the grease cup. More specifically, this tubular coupling elbow is of curved form and with the axes of its orifices arranged at an acute angle, that is of less than 90 degrees; and when screwed into the hub, one of the orifices lies in a radial line from the hub center while the other orifice lies substantially in a tangent to a circle described about the said hub center. As shown, the angle between the inlet and outlet orifices of the elbow coupling is approximately 45 degrees. This coupling means 6 has a curved tapering body having a tubular passage 8 through which the grease is moved, the smaller end of the body being externally screw threaded as at 7 for attachment to the wheel hub $3^a$ and the larger end provided with a screw threaded socket $7^a$ into which the threaded nipple $5^a$ of the grease cup 5 is screwed.

The grease cup may be of any suitable construction which will, during the running of the pulley, act to automatically feed the lubricant into and through the coupling 6 to the bearing. The construction of grease cup which I have found commercially most satisfactory for the purpose, is of the type known as a compressed air grease cup, namely one in which, in the adjustment of the cup, there is provided a compression of air within the same which acts automatically to force the grease from the cup to the bearing to compensate for the grease consumed thereat in the lubricating operation. The construction of this grease cup is clearly shown in the drawing and may be described as follows:—The body 9 is provided with a threaded nipple $5^a$ which screws into the coupling 6 and is also internally screw threaded at $9^a$. Into this body is screwed a cap 10 which is externally screw threaded at $10^a$. Within the cap is a removable disk and spring device, consisting of two disks 11 and 12, connected together by the interlooped U-shaped wires 14 respectively soldered to the two disks. By reason of these interlooped wires, the two disks cannot be separated a distance greater than the interior depth of the cap 10. A coil spring 13 is interposed between the disks 11 and 12 and surrounding the interlooped wires and acts to normally force the disks apart to the limit permitted by said wires. When inserted into the cap, one of the disks rests upon the shoulder at the inner bottom of the cap chamber 15, while the other disk is received within the chamber just below its open end. When the cup or body is filled with grease 16, the cap (and disk structure within it) is screwed into place. The friction of the disk 12 upon the shouldered portion of the cap causes it to rotate with the cap and thereby, through the connecting parts, cause the other disk 11 also to rotate and level the grease. Thereafter, the screwing in of the cap compresses both the spring 13 and the air within the chamber 15 of the cap, said spring and compressed air thereupon acting to automatically force the grease through the nipple into the coupling 6. A lock nut 17 may be used to lock the cap to the body to prevent accidental turning. This form of grease cup is fully shown and its mode of operation described in Letters Patent No. 1,148,473, granted to Edward F. Burrow on July 27, 1915, and no further description of it will be necessary except as to utilizing it in combination with the coupling device whereby it is correctly positioned for proper functioning and to nullify the objectionable effect of centrifugal action.

As before explained, when the grease cup is secured in position its axis of flow of lubricant is in a direction substantially at right angles to the radius of the wheel, and more correctly speaking is essentially tangential to a circle described about the axis of the wheel; and moreover, the nipple 5ª from which the lubricant flows into the coupling 6 is directed oppositely to the direction of rotation of the pulley and cup. The functioning which takes place is as follows: When the pulley is rotating in the direction of the arrow, the compressed air, the spring 13 and the inertia of the grease mass and disk device, are all tending to assist in feeding the grease from the cup into the coupling and thence to the journal bearing. The main centrifugal action is largely nullified, as the grease is held from moving outward by the side walls of the cup and cap and hence, is not materially affected except as it is propelled rearwardly into the coupling 6 by the combined action of compressed air, spring and inertia, as before stated.

The advantages of my improvements are especially obtained in pulleys or rotating devices having a high speed and where centrifugal action is a factor which must be reckoned with in the lubrication of the revolving element.

While I have described the compressed air automatic grease cup as being particularly desirable for the purposes of my invention, it is to be understood that I do not restrict myself thereto, as any automatic grease cup, with or without springs, which will positively feed the grease when the cup is in motion, may be used in combination with my improved coupling device 6 in the embodiment of my invention.

A secondary advantage of my invention resides in the fact that by arranging the grease cup in a tangential position for proper functioning, I am enabled to place a reasonably large grease cup in a relatively small radial space and also in a more satisfactory position for refilling with grease.

In respect to the centrifugal action as might exist in the tubular passage 8 of the coupling device 6, I would point out that the mass of grease is so small that it would not be seriously acted upon by centrifugal force; and any such action as might exist would be more than overcome by the suction produced in the hub revolving upon the shaft and by the similar centrifugal action and inertia of the grease mass in the nipple end of the cup and in the larger or socket end of the coupling device, said end being in a line which, if extended, cuts the radial line through the small end on an acute angle. It will be seen therefore, that whatever centrifugal action may be exerted, it is nullified and does not impair the functioning of the grease cup.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. A lubricating means for rotating objects, comprising an elbow coupling whose inlet and outlet ends are arranged at an angle of less than 90 degrees to each other and in which the outlet end of the coupling is secured in the rotating object to supply lubricant to its bearing, combined with a grease cup having its discharge end secured to the inlet end of the coupling and extending forward in the direction of rotation of the object.

2. A lubricating means for rotating objects, comprising an elbow coupling whose inlet and outlet ends are arranged at an angle of less than 90 degrees to each other and in which the outlet end of the coupling is secured in the rotating object to supply lubricant to its bearing, combined with a grease cup having its discharge end secured to the inlet end of the coupling and extending forward in the direction of rotation of the object said grease cup being provided with means for supplying pressure to move the grease backward with respect to the direction of rotation.

3. The combination of a pulley, an automatic grease cup arranged in the plane of rotation of the pulley and close to the hub thereof and having its direction of discharge generally tangential to a circle about the axis of the pulley and pointing rearwardly with respect to the direction of rotation, and a tubular coupling between the discharge end of the grease cup and the hub of the pulley.

4. The combination of a pulley, a compressed air grease cup arranged between its hub and flange and its general direction of discharge being tangential to a circle about the axis of the pulley for automatically discharging grease from the cup in a direction away from the pulley hub assisted by inertia and centrifugal action, and a tubular coupling device having its inlet and outlet arranged apart less than 90 degrees, the inlet being connected with the discharge end of the grease cup and the outlet being connected with the hub for guiding the grease to the hub bearing.

5. A coupling for connecting a grease cup in operative relation with the hub of a rotating object, consisting of an elbow having a curved aperture through it, one end of the elbow being threaded externally and the other internally, and the two ends being arranged a distance apart of less than 90 degrees.

In testimony of which invention I hereunto set my hand.

C. W. DEARDORFF.

Witnesses:
R. M. HUNTER,
E. W. SMITH.

Copies of this patent may be obtained for five cents each, by addressing the "Commissioner of Patents, Washington, D. C."